(12) United States Patent
Storm et al.

(10) Patent No.: US 11,392,922 B2
(45) Date of Patent: *Jul. 19, 2022

(54) VALIDATING TRANSACTIONS USING INFORMATION TRANSMITTED THROUGH MAGNETIC FIELDS

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,802

(22) Filed: Jun. 20, 2019

(65) Prior Publication Data
US 2020/0402038 A1 Dec. 24, 2020

(51) Int. Cl.
*G06F 21/43* (2013.01)
*G06Q 20/32* (2012.01)
(Continued)

(52) U.S. Cl.
CPC .......... *G06Q 20/327* (2013.01); *G06F 21/32* (2013.01); *G06F 21/42* (2013.01); *G06F 21/43* (2013.01);
(Continued)

(58) Field of Classification Search
CPC . G06F 21/32; G06F 21/42–43; H04L 63/0861
See application file for complete search history.

(56) References Cited

U.S. PATENT DOCUMENTS 9,697,508 B1 * 7/2017 Ramalingam ...... G06Q 20/2295
10,050,677 B1 8/2018 Thoen
(Continued)

OTHER PUBLICATIONS

IP.com [online], "Automatic Setup/ Configuration for New Devices," May 3, 2019, retrieved on Mar. 15, 2021, IP.conn No. IPC0M000253776D, 12 pages.
(Continued)

*Primary Examiner* — David J Pearson
(74) *Attorney, Agent, or Firm* — Fish & Richardson P.C.

(57) ABSTRACT

The technology described in this document can be embodied in a method that includes receiving, at one or more servers from a first computing device, (i) authentication information identifying a user-account associated with (a) the first computing device or (b) an application executing on the first computing device, and (ii) a transaction identifier generated by a second computing device. The transaction identifier is obtained by the first computing device by detecting one or more parameters of a magnetic field generated by the second computing device. The method also includes determining, by the one or more servers, that the user-account is authorized to initiate a transaction identified by the transaction identifier, and in response to determining that the user-account is authorized to initiate the transaction, transmitting, from the one or more servers to the second computing device, confirmation information usable by the second computing device to proceed with the transaction.

12 Claims, 7 Drawing Sheets

(51) Int. Cl.
 *G06K 7/08* (2006.01)
 *G06Q 20/40* (2012.01)
 *G06F 21/42* (2013.01)
 *G06F 21/32* (2013.01)
 *H04L 9/40* (2022.01)

(52) U.S. Cl.
 CPC ............ *G06K 7/087* (2013.01); *G06Q 20/40* (2013.01); *H04L 63/0861* (2013.01)

(56) References Cited

U.S. PATENT DOCUMENTS

| | | | |
|---|---|---|---|
| 10,182,328 B1 | 1/2019 | Maibach et al. | |
| 10,218,695 B1 | 2/2019 | Jain | |
| 10,467,398 B1 | 11/2019 | Derakhshani et al. | |
| 10,681,044 B1* | 6/2020 | Storm | H04W 4/80 |
| 2002/0059550 A1 | 5/2002 | Kondo et al. | |
| 2005/0261972 A1 | 11/2005 | Black | |
| 2007/0216405 A1 | 9/2007 | Takeuchi et al. | |
| 2008/0272892 A1 | 11/2008 | O'Byrne et al. | |
| 2009/0253984 A1 | 10/2009 | Yui et al. | |
| 2010/0320266 A1* | 12/2010 | White | G06Q 20/3276 235/375 |
| 2012/0284427 A1 | 11/2012 | Dods et al. | |
| 2013/0072115 A1 | 3/2013 | Dobyns | |
| 2013/0079037 A1* | 3/2013 | Dobyns | H04W 4/21 455/456.3 |
| 2013/0148828 A1 | 6/2013 | Fort et al. | |
| 2013/0221094 A1 | 8/2013 | Smith et al. | |
| 2014/0184505 A1 | 7/2014 | Fullerton et al. | |
| 2015/0207232 A1 | 7/2015 | Dolgin | |
| 2015/0348044 A1 | 12/2015 | Smith | |
| 2015/0373537 A1 | 12/2015 | Toksvig et al. | |
| 2016/0066185 A1 | 3/2016 | Dobyns et al. | |
| 2016/0071089 A1 | 3/2016 | Boivie | |
| 2016/0103200 A1 | 4/2016 | LoPresti | |
| 2016/0142856 A1 | 5/2016 | Worrall et al. | |
| 2016/0162883 A1* | 6/2016 | Liscia | G06K 19/06206 705/71 |
| 2016/0191120 A1 | 6/2016 | Dobyns et al. | |
| 2016/0253651 A1 | 9/2016 | Park et al. | |
| 2016/0260075 A1 | 9/2016 | deKozan et al. | |
| 2016/0278012 A1 | 9/2016 | Kawahara et al. | |
| 2016/0294426 A1 | 10/2016 | Pahuja | |
| 2016/0321633 A1 | 11/2016 | Chandrasekaran et al. | |
| 2016/0379205 A1* | 12/2016 | Margadoudakis | G06Q 20/327 705/71 |
| 2017/0011745 A1 | 1/2017 | Navaratnam | |
| 2017/0024742 A1* | 1/2017 | Khan | G06Q 20/4012 |
| 2017/0178103 A1 | 6/2017 | Peri et al. | |
| 2017/0180009 A1 | 6/2017 | McManus et al. | |
| 2017/0308884 A1 | 10/2017 | Zou et al. | |
| 2018/0005220 A1 | 1/2018 | Laracey et al. | |
| 2018/0012228 A1* | 1/2018 | Milevski | G06K 9/00885 |
| 2018/0040954 A1 | 2/2018 | Richardson et al. | |
| 2018/0082220 A1 | 3/2018 | Bombacino et al. | |
| 2018/0097275 A1* | 4/2018 | Lee | G06F 1/1637 |
| 2018/0115050 A1 | 4/2018 | Yang et al. | |
| 2018/0121912 A1 | 5/2018 | Morales | |
| 2018/0204204 A1 | 7/2018 | Giraudo et al. | |
| 2018/0241577 A1 | 8/2018 | D'Souza et al. | |
| 2018/0349889 A1 | 12/2018 | Ghosh et al. | |
| 2019/0213311 A1 | 7/2019 | Tussy | |
| 2019/0222570 A1 | 7/2019 | Krishan | |
| 2020/0005263 A1* | 1/2020 | Arora | G06Q 20/1085 |
| 2021/0028850 A1 | 1/2021 | Elliott et al. | |
| 2021/0037281 A1* | 2/2021 | Xian | H04N 21/2401 |

OTHER PUBLICATIONS

IP.com [online], "Method and Apparatus for Mobile Identity Authentication" Mar. 29, 2019, retrieved on Mar. 15, 2021, IP.conn No. IPC0M000194545D, 71 pages.

\* cited by examiner

```
                                                    400
                                                      ↘
┌─────────────────────────────────────────────────────┐
│ Receive, from a first computing device, (i) authentication │
│ information identifying a user-account associated with (a) │
│ the first computing device or (b) an application executing │
│ on the first computing device, and (ii) a transaction      │
│ identifier generated by a second computing device, wherein │
│ the transaction identifier is obtained by the first computing │ — 405
│ device by detecting one or more parameters of a magnetic   │
│ field generated by the second computing device             │
└─────────────────────────────────────────────────────┘
                            │
                            ▼
┌─────────────────────────────────────────────────────┐
│ Determine, based on the authentication information, that │
│ the user-account is authorized to initiate a transaction │
│ identified by the transaction identifier                 │ — 410
└─────────────────────────────────────────────────────┘
                            │
                            ▼
┌─────────────────────────────────────────────────────┐
│ Transmit, to the second computing device, confirmation │
│ information usable by the second computing device to   │
│ proceed with the transaction                           │ — 415
└─────────────────────────────────────────────────────┘
```

Generate, by the kiosk device, a magnetic field to encode a transaction identifier
502

Receive, from one or more servers by the kiosk device, confirmation information identifying a mobile device that detects the transaction identifier generated by the kiosk device
504

Responsive to receiving the confirmation information by the kiosk device, proceeding with the transaction
506

VALIDATING TRANSACTIONS USING INFORMATION TRANSMITTED THROUGH MAGNETIC FIELDS

TECHNICAL FIELD

This disclosure relates to methods and systems of processing financial transactions by exchanging information over magnetic fields.

BACKGROUND

Financial transactions such as in-person purchases can be accomplished using various communication channels and mediums of exchange. Various methods of payment utilize the processing and sensing capabilities of mobile computing devices to perform safe transactions.

SUMMARY

In one aspect, this document features a computer-implemented method that includes receiving, at one or more servers from a first computing device, (i) authentication information identifying a user-account associated with (a) the first computing device or (b) an application executing on the first computing device, and (ii) a transaction identifier generated by a second computing device. The transaction identifier is obtained by the first computing device by detecting one or more parameters of a magnetic field generated by the second computing device. The method also includes determining, by the one or more servers based on the authentication information, that the user-account is authorized to initiate a transaction identified by the transaction identifier, and in response to determining that the user-account is authorized to initiate the transaction, transmitting, from the one or more servers to the second computing device, confirmation information usable by the second computing device to proceed with the transaction.

Implementations of the above aspect can include one or more of the following features. The authentication information can be transmitted from the first computing device responsive to determining that a user of the first computing device is authorized to access the user-account. The first computing device can be communicatively connected to a wearable device and the authentication information can be transmitted from the first computing device responsive to receiving a transaction confirmation from the wearable device. The transaction identifier can include transaction information and an identifier of the second computing device. The one or more parameters of the magnetic field can include at least one of a strength of the magnetic field and a direction of the magnetic field. The first computing device includes a receiver including a magnetic sensor configured to detect changes to the one or more parameters of the magnetic field.

In another aspect, this document features a method of processing a transaction at a kiosk device. The method includes generating, by the kiosk device, a magnetic field to encode a transaction identifier. The method also includes receiving, from one or more servers by the kiosk device, confirmation information identifying a mobile device that detects the transaction identifier generated by the kiosk device, and responsive to receiving the confirmation information by the kiosk device, proceeding with the transaction.

Implementations of the above aspect can include one or more of the following features. The confirmation information can be transmitted from the one or more servers to the kiosk device responsive to receiving, by the one or more servers from the mobile device: (i) authentication information identifying a user-account associated with (a) the mobile device or (b) an application executing on the mobile device, and (ii) a transaction identifier generated by the kiosk device, wherein the transaction identifier is obtained by the mobile device by detecting one or more parameters of the magnetic field generated by the kiosk device. The authentication information can be transmitted from the mobile device to the one or more servers responsive to determining, by the mobile device, that a user of the mobile device is authorized to access the user-account. The mobile device can be a wearable device communicatively connected to a second mobile device, and the confirmation information can be transmitted from the one or more servers to the kiosk device responsive to receiving, by the one or more servers, the transaction identifier from the second mobile device, where the transaction identifier is transmitted from the second mobile device upon receiving the transaction identifier from the wearable device. The transaction identifier can include transaction information and an identifier of the kiosk device. Generating the magnetic field can include changing one or more parameters of the magnetic field, the one or more parameters of the magnetic field including at least one of a strength of the magnetic field and a direction of the magnetic field. A receiver of the mobile device can include a magnetic sensor configured to detect the magnetic field to receive the transaction identifier.

In another aspect, this document features a system that includes at least one processing device and a memory communicatively coupled to the at least one processing device. The memory stores instructions which, when executed, cause the at least one processing device to perform operations that include receiving, from a first computing device, (i) authentication information identifying a user-account associated with (a) the first computing device or (b) an application executing on the first computing device, and (ii) a transaction identifier generated by a second computing device. The transaction identifier is obtained by the first computing device by detecting one or more parameters of a magnetic field generated by the second computing device. The operation also include determining, based on the authentication information, that the user-account is authorized to initiate a transaction identified by the transaction identifier, and in response to determining that the user-account is authorized to initiate the transaction, transmitting, to the second computing device, confirmation information usable by the second computing device to proceed with the transaction.

In another aspect, this document features a non-transitory computer-readable storage medium having encoded thereon computer readable instructions for causing one or more processing devices to perform operations that include receiving, from a first computing device, (i) authentication information identifying a user-account associated with (a) the first computing device or (b) an application executing on the first computing device, and (ii) a transaction identifier generated by a second computing device, wherein the transaction identifier is obtained by the first computing device by detecting one or more parameters of a magnetic field generated by the second computing device. The operation also include determining, based on the authentication information, that the user-account is authorized to initiate a transaction identified by the transaction identifier; and in response to determining that the user-account is authorized to initiate the transaction, transmitting, to the second computing device, confirmation information usable by the second computing device to proceed with the transaction.

Implementations of the above aspects can include one or more of the following features. The authentication information can be transmitted from the first computing device responsive to determining that a user of the first computing device is authorized to access the user-account. The first computing device can be communicatively connected to a wearable device, where the authentication information is transmitted from the first computing device responsive to receiving a transaction confirmation from the wearable device. The transaction identifier can include transaction information and an identifier of the second computing device. The one or more parameters of the magnetic field can include at least one of a strength of the magnetic field and a direction of the magnetic field. The first computing device can include a receiver including a magnetic sensor configured to detect changes to the one or more parameters of the magnetic field.

In another aspect, this document features a system that includes at least one processing device and a memory communicatively coupled to the at least one processing device, the memory storing instructions which, when executed, cause the at least one processing device to perform operations for processing a transaction. The operations include generating a magnetic field to encode a transaction identifier. The operations also include receiving, from one or more servers, confirmation information identifying a mobile device that detects the transaction identifier, and responsive to receiving the confirmation information, proceeding with the transaction.

In another aspect, this document features a non-transitory computer-readable storage medium that has encoded thereon computer readable instructions for causing one or more processing devices to perform operations for processing a transaction. The operations include generating a magnetic field to encode a transaction identifier. The operations also include receiving, from one or more servers, confirmation information identifying a mobile device that detects the transaction identifier, and responsive to receiving the confirmation information, proceeding with the transaction.

Implementations of the above aspects can include one or more of the following features. The confirmation information can be transmitted from the one or more servers to the at least one processing device responsive to receiving, by the one or more servers from the mobile device: (i) authentication information identifying a user-account associated with (a) the mobile device or (b) an application executing on the mobile device, and (ii) a transaction identifier generated by the at least one processing device. The transaction identifier is obtained by the mobile device by detecting one or more parameters of the magnetic field generated by the at least one processing device. The authentication information can be transmitted from the mobile device to the one or more servers responsive to determining, by the mobile device, that a user of the mobile device is authorized to access the user-account. The mobile device can be a wearable device communicatively connected to a second mobile device, where the confirmation information is transmitted from the one or more servers to the at least one processing device responsive to receiving, by the one or more servers, the transaction identifier from the second mobile device, where the transaction identifier is transmitted from the second mobile device upon receiving the transaction identifier from the wearable device. The transaction identifier can include transaction information and an identifier of a kiosk device associated with the at least one processing device. Generating the magnetic field includes changing one or more parameters of the magnetic field. The one or more parameters of the magnetic field includes at least one of a strength of the magnetic field and a direction of the magnetic field. A receiver of the mobile device can include a magnetic sensor configured to detect the magnetic field to receive the transaction identifier.

Various implementations described herein may provide one or more of the following advantages. By using a magnetic signal to communicate transaction information to a mobile device, transactions can be accomplished without requiring significant affirmative actions by the user with respect to a mobile device. Additionally, by using a near-field magnetic induction (NFMI) transmitter and leveraging the sensing capabilities of mobile devices, a communication channel between the transmitter and mobile devices can be more secure than other transaction systems. For example, the NFMI transmitter can form a relatively small 'magnetic bubble' that is immune from radio frequency (RF) interference and virtually secure from eavesdropping from outside that "bubble". Additionally, the method described herein reduces the exchange of sensitive data by eliminating the need to transmit data from the mobile device to the kiosk device, reducing the risk of such data being compromised.

Repeat use of reference characters in the present specification and drawings is intended to represent same or analogous features or elements.

DETAILED DESCRIPTION

This document presents technology for facilitating transactions between two computing devices (e.g., a kiosk device and a mobile computing device) via exchange of information over a magnetic field between the two devices. In one example, a kiosk device transmits information identifying a transaction by modulating a magnetic field generated by the kiosk. A mobile device present in the magnetic field can detect the changes to the magnetic field (e.g., using a magnetic sensor such as a magnetometer) to receive the information, and provide it to a remote server (e.g., a server associated with a financial account of the user). Once the remote server determines that a user of the mobile device is authorized to make the transaction, a transaction conformation is sent to the kiosk device, which proceeds with completing the transaction requested by the user. Because the transaction information is transmitted from a first device (e.g., a kiosk) to a second device (e.g., a mobile device) over a magnetic field, no specific action may be required on the part of a user of the mobile device to receive the information. For example, unlike what happens in a quick response (QR) code based transaction—where the user has to point a camera of a mobile device towards an image of a QR code to proceed with a transaction—the information can be transmitted to the mobile device as long as the mobile device is within a detectable range of the magnetic field of the first device. This in turn can reduce user-actions required to process a transaction and provide an improved user experience. In fact, as long as the user is authenticated (e.g., by way of a connected wearable device such as a smart watch) to a corresponding mobile device, or a financial account accessible via the mobile device, a transaction can be completed even without the user having to physically retrieve the mobile device. Also, because detectability of a magnetic field generated by a particular device can be inversely proportional to a cube of the distance from the device (the decay of the magnetic field may vary based on the type of magnet used by the particular device), the technology can be configured to allow transactions only when the two devices are within a low threshold distance (e.g., 2-3 feet) from one another. In some cases, this can ensure that the transaction is secure, and the transfer of information is not intercepted by any malicious entity at a relatively remote location.

Various financial transactions occur in person, in which a purchaser presents a financial institution card (e.g., credit card), a mobile device, a key fob, a smart card, or other forms of payment to complete the transaction. Some payment systems can leverage various communication channels to perform secure transactions including contactless payments. For example, some systems can leverage mobile devices and network channels to process safe transactions without swiping a card. Such systems can include the use of wireless communication methods such as near field communication (NFC) protocols in which a mobile device or a card is placed near a card reader or an NFC reader to perform the transaction. Such methods require the user to position the mobile device near the reader (e.g., within 0-2 inches) which can be inconvenient in some cases. Other systems include the use of encoded images (e.g., QR codes or barcodes) to perform transactions. For example, a purchaser can use a mobile device to scan a QR code to obtain the transaction information and send the information to a remote server to process a payment. However, the use of QR codes or barcodes also require multiple affirmative actions by the user (e.g., pointing the camera towards the code to capture an image etc.) to have the transaction processed.

The technology described herein facilitates processing of a transaction between two computing devices without requiring significant affirmative actions by the user with respect to a mobile device. For example, when a user carrying a mobile device interacts with another device (e.g., a kiosk device for ordering fast food), the corresponding transaction information (including identification information about the kiosk, the amount associated with the transaction, etc.) can be transferred to the user's mobile device (as long it is within the vicinity) via magnetic induction, without the user having to even retrieve the mobile device. As long as the user is authenticated to the device (and/or any financial account accessible through the device), the transaction information can be provided to a remote server for payment processing substantially automatically. For example, if the user is wearing a connected wearable device such as a smartwatch, the user may be automatically authenticated to the mobile device and/or the financial accounts accessible via the mobile device. In any case, the user may have to at most provide some authentication information via the connected wearable device or the mobile device itself for the transaction to proceed. As such, the technology described herein facilitates a seamless user-experience where the number of affirmative actions performed by the user on the mobile device is low.

In one representative example, when a user attempts to perform a transaction at a secured device (e.g., a kiosk device), the secured device transmits a magnetic signal (e.g., a frequency encoded bit string) using an electromagnet, wherein the magnetic signal is encoded with a transaction identifier that includes the transaction information and an identifier of the secured device. The magnetic signal can be transmitted, for example, by changing the magnetization of a magnetic material (e.g., by changing one or more parameters of a current flowing through a conductor around a ferromagnetic material core), which in turn changes one or more parameters (e.g., a direction and/or strength) of the corresponding magnetic field. A mobile device (e.g., a smartphone or a smartwatch) in magnetic communication with the secured device (e.g. the kiosk) detects the signal from the secured device using a magnetic sensor (e.g., a magnetometer configured to detect the changes when placed in the magnetic field). The mobile device then sends, after the user associated with the corresponding mobile device has been authenticated by the mobile device, (i) the transaction identifier and (ii) authentication information (e.g., information identifying a user-account associated with [a] the mobile device or [b] an application executing on the mobile device) to a remote back-end system implemented, for example, on a server. In some examples, the information identifying the user-account includes an account number and a mobile device identifier (e.g., the phone number of the mobile device) linked to the account number. In response, the server sends confirmation information (e.g., a confirmation that the user has been authenticated/verified and that the transaction has been approved) to the secured device. Upon receiving the confirmation information from the server, the secured device proceeds with the transaction. Upon verification and confirmation, the payment may be automatically deducted from the user-account or an account linked to the user-account to complete the transaction.

In the example of a kiosk device, the device can have one or more electromagnets or transmitting coils positioned close to where the user stands to interact with the kiosk device. Such an arrangement can include a near field magnetic induction (NFMI) transmitter module. Such NFMI transmitter can be activated using a proximity signal from a sensor (e.g., a proximity sensor) connected to the kiosk device such that the NFMI transmitter is triggered only when a user (along with his or her device) is within range to receive a magnetic signal encoded with the identifier of the kiosk device. These proximity sensors can include simple IR or ultrasonic proximity sensors, vision based proximity sensors, or pressure-sensing ground plates etc. In some implementations, the NFMI transmitter may have multiple coil systems for different zones and activate its coils only in the zone(s) where user presence is detected by the aforementioned proximity sensors. Such NFMI transmitter can generate a magnetic field detectable by the mobile device disposed within a limited vicinity (e.g., 0 to 36 inches) of the transmitter. Such system may improve the user experience by increasing the speed and accuracy of authentication and can also add a security layer to additional biometric authentication methods by including a second factor (user's trusted device) in the authentication loop.

The magnetic field generated by the NFMI transmitter can establish a communication channel with the mobile device that is more secure than other systems. For example, a concern with contactless payments is that of eavesdropping.

Eavesdropping occurs when a third party intercepts the signal sent between two devices. If the third party intercepted a data transmission between a smartphone and a credit card reader, the third party can have access to sensitive information such as credit card information. Eavesdropping can be a security concern for technologies such as QR, NFC, RFID, Bluetooth, and others since all of these can either be visually observed (QR code) or electronically sensed at a distance much further away from the "transponder" than the actual customer position (i.e. Bluetooth transmits it's signal 30 feet or more). However, the NFMI transmitter creates a relatively small 'magnetic bubble' that is immune from radio frequency (RF) interference and virtually secure from eavesdropping from outside that "bubble". An eavesdropper would have to be standing next to the NFMI transmitter, within the magnetic bubble, to intercept wireless transmissions between the NFMI transmitter and the mobile device. Additionally, the method described herein reduces the exchange of sensitive data by eliminating the need to transmit data from the mobile device to the kiosk device, reducing the risk of such data being compromised. Further, there is no "customer" data (i.e. identifier, account information, etc.) exchanged from the mobile device to the kiosk. Thus there is no sensitive data from the end customer available to "hack" even if the magnetic field is "read". The information is flowing "one-way" from the kiosk to the mobile device (kiosk device, purchase amount, etc.). The system then accomplishes the payment through alternative communication (through the mobile device's standard, much more secure, connection to the application servers).

Figure 1A:
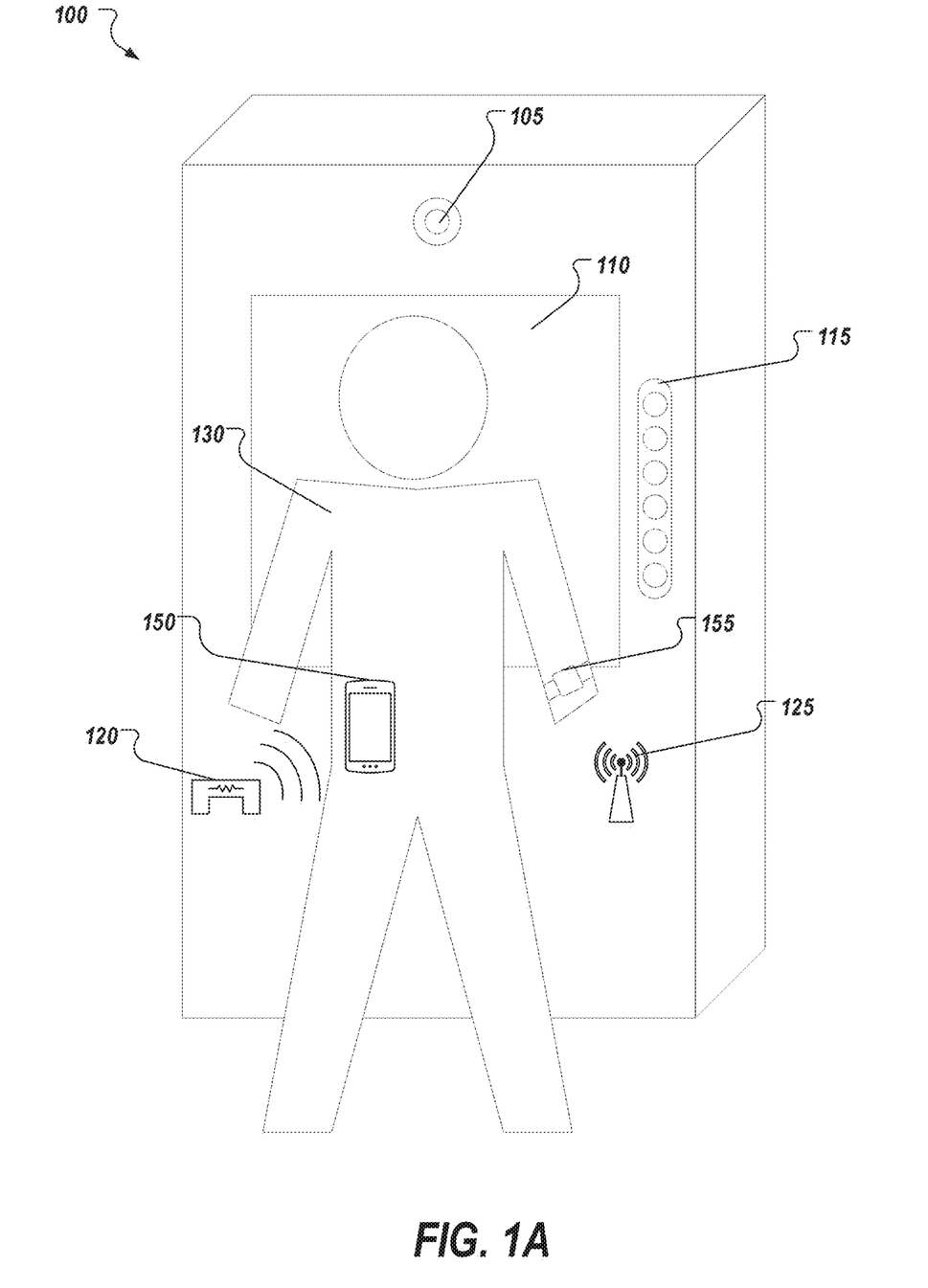
FIG. 1A shows a kiosk machine as an example environment in which the technology described herein may be used.

FIG. 1A shows a kiosk machine 100 as an example environment in which the technology described herein may be used. Such kiosk machines may be used for various purposes such as processing a transaction. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of a store, an arena, or a stadium) to charge entrants prior to entering the venue. In general, the kiosk 100 may be deployed at various types of locations to process transactions interactively. Additionally, the technology described herein may be deployed on a different environment in which an NFMI transmitter can be implemented, such as rental bicycles or scooters or other related environments; including replacing QR codes in places where a mobile device is used to scan and receive visible and unprotected information.

The kiosk 100 is configured to process a transaction by communicating a transaction identifier to the mobile device and receiving confirmation from a server system. For example, the kiosk 100 may include a display device 110 (e.g., a capacitive touch screen) that allows a user 130 to select and order food at a retail outlet. Once the user completes the selection via user-interface presented on the display device 110, the kiosk 100 can send a transaction identifier via a magnetic field to a mobile device 150 of the user 130. Upon detecting or receiving the transaction identifier, the mobile device can be prompted to verify that the user 130 is associated with a user account of the mobile device. For example, the mobile device can have software (e.g., a mobile application) that prompts the user, upon receiving the transaction identifier from the NFMI transmitter, to perform an authentication step. For example, the mobile device 150 can include one or more components that support a biometric authentication system such as a camera or a fingerprint sensor that captures biometric information from the user (e.g., images of the user interacting with the mobile device). The captured biometric information may be processed using an underlying biometric authentication system (e.g., using facial recognition or iris recognition) to identify/authenticate the user as an authorized user of a user-account associated with the mobile device. In some implementations, the mobile device 150 can instead or in addition prompt the user to enter credentials associated with a user-account of the mobile device to authenticate the user. In some implementations, the mobile device may authenticate the user before the magnetic signal is sent to the mobile device (e.g., the user has previously logged in to the mobile application and remains logged in), in which cases the mobile device may prompt the user to simply confirm the purchase or even proceed with the transaction without user confirmation. As further explained in detail with respect to FIG. 2, after the user has been authenticated/verified, the mobile device 150 or a server system in communication with the mobile device 150 can send a confirmation to the kiosk device 100 to proceed with the transaction.

In some implementations, the kiosk 100 can authenticate the user or complete the authentication process. For example, the kiosk 100 can include one or more components that support a biometric authentication system such as an illumination source 115 and a camera 105 that captures images of users interacting with the kiosk 100. The captured images may be processed using an underlying biometric authentication system to identify/authenticate the user. For example, a server system can send identification information (e.g., previously enrolled biometric templates) pertaining to the user to the kiosk device 100. The kiosk 100 can then compare the independently obtained information with the identification information received from the server, and verify that the user attempting to perform a transaction is the same user who is associated with the mobile device.

Figure 1B:
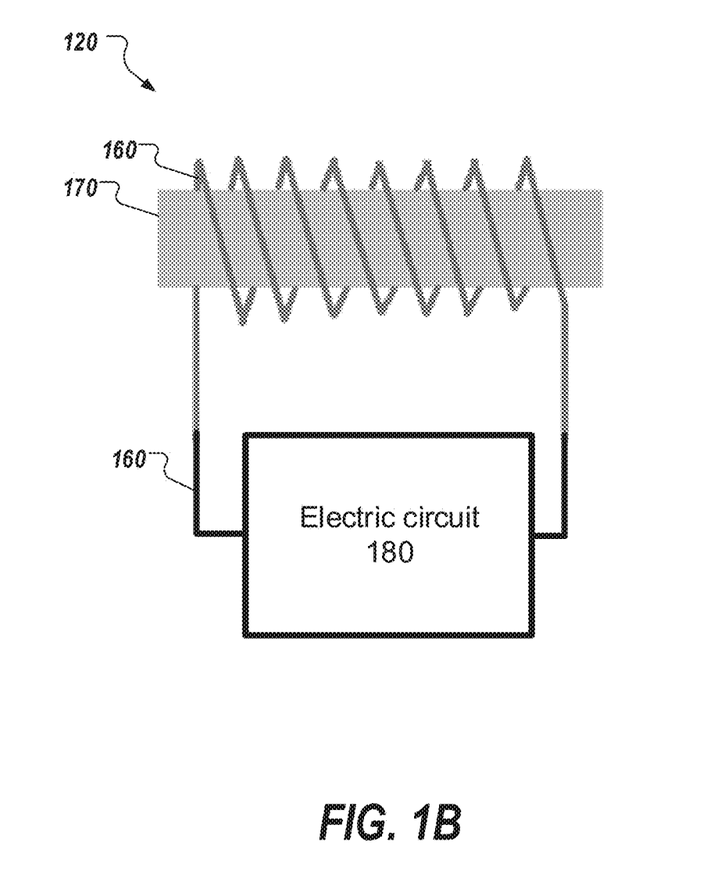
FIG. 1B shows a schematic view of a transmitter module.

Referring to FIGS. 1A and 1B, the kiosk 100 includes a transmitter module 120 such as an electromagnet. The transmitter module 120 transmits the transaction information and a kiosk identifier to the mobile device 150 of a user 130 standing in front of or near the kiosk. FIG. 1B shows an example of an electromagnet that includes a conductor 160 (e.g., a magnetic coil) wound around a magnetic core 170. The conductor 160 is electrically coupled to an electric circuit 180 that includes a power source. The electric circuit 180 controls the electric current sent through the conductor to control the magnetic field of the electromagnet. For example, the magnetic field is generated by changing one or more parameters of a current (e.g., increasing and decreasing the current or changing the direction of the current) flowing through the conductor 160 around the magnetic core 170 disposed at the kiosk 100. The electric circuit 180 can facilitate wireless transmission of the encoded data (e.g., a transaction identifier and a kiosk identifier) using a current that changes one or more parameters of a corresponding magnetic field (e.g., changing the strength and direction of the magnetic field) as the current passes through the wound coil 160. The strength of the magnetic field can be measured as a magnetic flux density. In some implementations, the electromagnet can be part of an NFMI communication system in which the electromagnet is configured to generate a magnetic field that includes an NFMI signal.

In some implementations there are up to three magnetic coils 160 in the transmitter module, along perpendicular axes, to encode the data points in a 3 dimensional vector space to improve data transmission quality and rate. To calibrate the receiver's orientation with that of this three dimensional NFMI transmitter to correctly decipher the transmitted data points in three dimensional magnetic coordinate system, the transmitter (e.g. kiosk) will send a predetermined handshake signal declaring its x, y, and z axes directions in certain order (e.g. sending a maximally correlational code such as a Barker sequence alongside x, then, y, and finally z direction), and then the receiver (e.g., the mobile device 150) will calibrate its orientation and find the spatial rotation matrix between transmitter and receiver given the received sequence and comparing it to the expected transmitted sequence. In other words, to increase the effectiveness of the mobile device 150 in picking up the signal, the mobile device 150 can consider and use the most likely orientation of the sensor axis with respect to the magnetic signal that is most likely to receive a strong signal for decoding the magnetic signal. For example, an energy of target frequencies along with the expected duration of the signal can be used to judge which sensor axes to include in the decoding process. In some implementations, incoherent detection or short-term Fourier transform is used to detect the frequency-coded information or symbols (FSK or m-FSK). Other frequency detection processes, such as ones employing a Goertzel algorithm, can also be used. In some implementations, the magnetic signal information is encoded into the onsets of maximally correlated codes such as Barker sequences or chirps. In some implementations, the transmitter can send FSK signals to the mobile device at a frequency up to half of the magnetometer sensors' sampling rate (typically 100 Hz) at speeds of up to 20 bits per second.

As shown in FIG. 1A, the user 130 has a mobile device 150 such as a smartphone. The mobile device includes any computing device that can be carried or worn by user 130, such as a smartphone, tablets, a Personal Digital Assistant (PDAs), a smartwatch, and so forth. The mobile device 150 can have decoding software configured to decode the change to the one or more parameters of the magnetic field. For example, the mobile device 150 may be programmed (e.g., through an installed application) to detect, decode, and send the magnetic signal (or its decoded information such as the transaction identifier) transmitted via the transmitter 120. For example, mobile device 150 can be a smartphone that has a receiver (not shown) for receiving the magnetic signal. The receiver of the mobile device 150 detects the parameter changes of the magnetic field or the magnetic oscillations produced by the electromagnet (FIG. 1B). In some implementations, detecting the changes to the parameters includes detecting a frequency at which the one or more parameters change. Such receiver can include one or more magnetic sensors such as a magnetometer, a Hall Effect sensor, or a compass and decoding software that, in combination with the sensors, receives the magnetic signal and decodes the signal or detects the onset/preamble and transmits the ensuing signal to a server or a third device for final processing and decoding. As further discussed in detail with respect to FIG. 2, the mobile device 150 sends a mobile device identifier and information received from the magnetic signal to a server that then, based on the received information, sends a confirmation to the kiosk device 100 that is used to complete the transaction, or to perform any other action that might be necessary based on detection of the presence of user's device (e.g., trusted device) in the vicinity of the transmitting kiosk. In some implementations, the mobile device 150 is communicatively connected to a wearable device 155 such as a smartwatch. The wearable device 155 can have a receiver (not shown) such as a magnetic sensor for receiving the transaction identifier sent by the kiosk. Upon detecting the magnetic signal, the wearable device 155 can prompt the user to confirm the transaction. Upon receiving the confirmation from the user, the wearable device 155 can transmit the transaction identifier to the mobile device 150, which can in turn authenticate the user and send the authentication information and transaction identifier to the server. In some implementations, the wearable device 155 can authenticate the user and communicate directly with the server. For example, the wearable device 155 can validate the user before receiving the magnetic signal. In some cases, the wearable device 155 can validate the user and remain in a 'validated connected mode' in which the user wears the wearable device and the wearable device is communicatively connected to the mobile device 150. In such implementations, the wearable device 122 can receive the transaction identifier from the kiosk 100 and send the transaction identifier to the mobile device 150, which can in turn send the transaction identifier and the authentication information (e.g., authentication information stored in the wearable device or in the mobile device) to the server without requiring the user to interact with the wearable device or the mobile device during the transaction.

In some implementations, the mobile device 150 has a low-frequency receiver with a sampling rate of up to 100 Hz, usually in form of multi-axes magnetic sensor. In some implementations, aliasing can be used when decoding a higher frequency chip with a low-sampling rate receiver. For example, magnetic signals with higher-than-sampling rate frequencies (e.g., frequencies modulated using frequency-shift keying [FSK]), such as 140 Hz can be equivalent to 40 Hz at the receiver side at 100 Hz sampling. The bit rate may be increased by using multi frequency-shift keying (m-FSK) modulation where m>2, e.g., by assigning 00 to 35, 01 to 40, 10 to 45, and 11 to 50 Hz, besides shortening symbol duration. Typical symbol duration is 100-200 ms providing up to 20 bits/sec using the above-mentioned values. In some implementations, higher frequency magnetic waves may be used for data transmission by taking advantage of aliasing. In this implementation, one can increase the transmission signal frequency by an integer multiple of the sampling frequency. For instance, if the magnetic sensor's sampling frequency is 100 Hz and the original %1 FSK symbol frequencies were set at 35 and 45 Hz respectively, one can use new aliased transmitter frequencies of 135/145 Hz or 235/245 Hz with the same effective (aliased) readout of $^{35}\!/_{45}$ Hz on the receiver side. In some implementations, a preamble magnetic signal can be transmitted using the same or different frequency bands via a magnetic transmitter to indicate the start of the transmission and synchronization for a data pulse train.

The kiosk device 100 may include a processing computer (not shown) communicatively coupled with the transmitter 120. The processing computer can process the transaction and generate a transaction identifier. The transaction identifier can be a unique code such as a transaction code and can include transaction details (without including sensitive customer information). For example, the transaction identifier can include transaction information such as items, quantities, amounts, any applicable taxes, date, time, shipping costs, and the like. The kiosk identifier can be a unique code that identifies the corresponding kiosk. The processing computer may encode the transaction identifier and the kiosk identifier in a binary code. For example, the transaction identifier and the kiosk identifier may be encoded via FSK or m-FSK modulation. The computer may then send a data stream with the binary code to the transmitter 120. The transmitter 120, upon receiving the binary code, converts such code into magnetic changes that have a frequency associated with the binary code. For example, the transmitter may produce a different frequency for each bit of a binary code.

In some implementations, in order to improve accuracy or user experience (or both), one can use the time stamps of the transmitted signals for transmitter station identification or disambiguation. Since the transmitting stations and the receiving devices are both in communication with the service provider's servers, the server can use the time stamps of the transmitted signal(s) from broadcasting station(s) (where the user triggered the proximity sensor and initiated the magnetic wave transmission) to match them with those received by user device(s) with closest time stamp(s) or other temporal signatures such as pulse intervals, duration, and matching templates. In some implementations, this information is auxiliary and used for disambiguation (increasing signal entropy) in conjunction with other codes such as Frequency-shift keying (FSK). For example, one or more modulation techniques can be used to encode the binary data. Such modulation techniques include FSK, Phase-shift keying (PSK), Amplitude-shift keying (ASK), or other resilient codes, and perhaps with error detection and maybe error correction. In some implementations, all the information is encoded temporally using indicators such as onset, duration, and intervals of transmitted signal bursts. In such cases, one may use signal compression techniques such as chirps, Barker codes, and pseudo-random sequences to create burst signals with higher signal to noise ratio and temporal resolution for temporal signature encoding, while keeping the burst duration short enough for better user experience.

As shown in FIG. 1A, the kiosk device 100 can additionally include a wireless module 125 such as a Bluetooth module. The wireless module 125 may, in addition to the transmitter 120, communicate wirelessly with the electronic device 150 to send the kiosk identifier or other information. In some implementations, the wireless module 125 may be used to 'awaken' the mobile device 150. For example, the decoding routine software (e.g., a pre-installed mobile application) may be awakened by the Bluetooth beacon (or another location-based service) so that the decoder of the mobile device can be triggered only when the user 130 is in front of or facing the kiosk device 100. Such feature can improve the security of the system, decrease power consumption of the mobile device and the kiosk device, and decrease false positives. Additionally, the wireless module 125 or similar can increase the reliability of the biometric authentication system described herein. For example, even if the mobile device 150 doesn't correctly decode or partially decodes the magnetic signal, the server or kiosk device 100 can combine the mobile device identification information with identification information received by the wireless module 125 (or similar) to identify the user 130.

Figure 2:
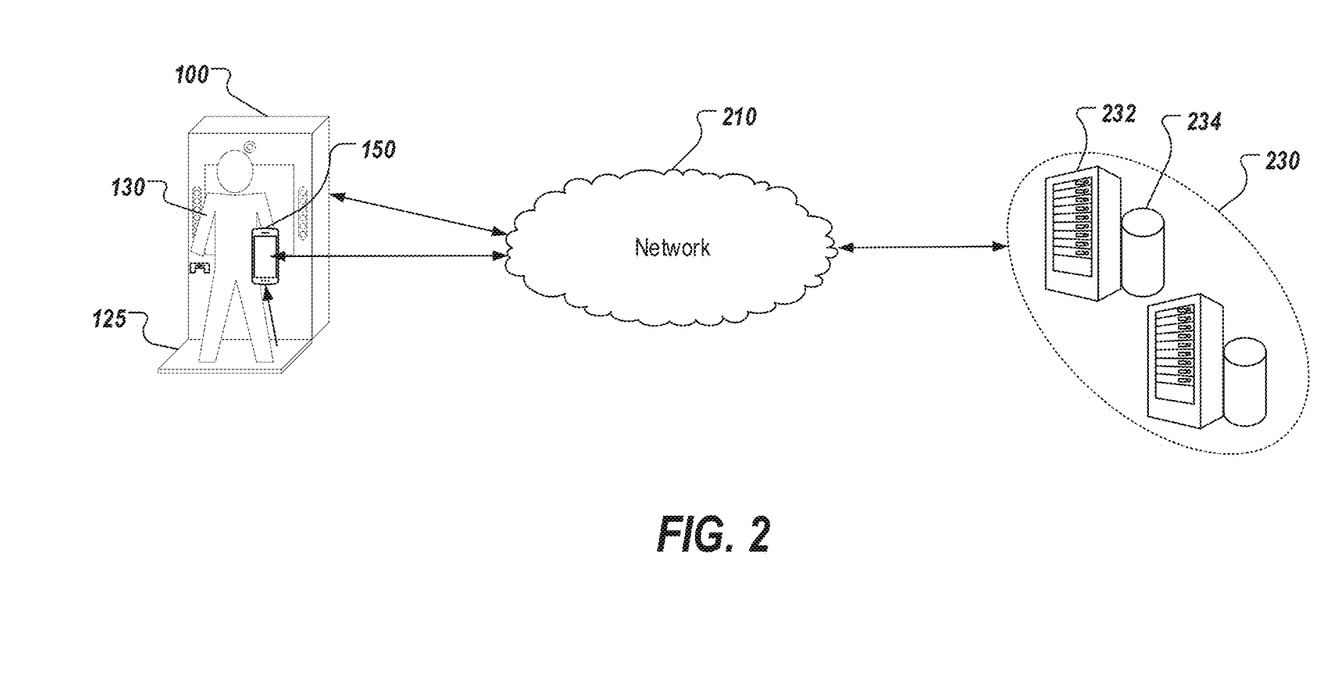
FIG. 2 depicts an example architecture in accordance with implementations of the present disclosure.

Referring to FIG. 2, a transaction system leverages a mobile computing device 150, transmitters, sensors, and communication channels such as data networks to process a transaction. For example, a user 130 standing in front of the kiosk 100 may perform a transaction using the mobile device 150 without having to scan a computer-readable code or having to position the mobile device adjacent a cardless reader. In this example, a back-end system such as a server system 230 includes one or more processing devices 232 and memories 234 that store information associated with user 130, such as facial images captured during an enrollment process or encrypted credentials. The mobile device 150 may be programmed (e.g., through an installed application) to detect, decode, and send the information received as a magnetic signal transmitted from the kiosk 100. The information encoded in the magnetic signal may include a transaction identifier and a kiosk identifier. Upon receiving and decoding the magnetic signal, mobile device 150 authenticates the user. For example, the mobile device 150 can determine that the user 130 is authorized to access the user-account associated with the mobile device or an application of the mobile device. In some implementations, the mobile device 150 can authenticate the user using a biometric authentication method, a password authentication method, or a similar method. Upon verifying the user, the mobile device 150 sends, through a network 210, (1) authentication information which may include a confirmation that the user has been verified or partially verified (and in some cases can include biometric information gathered by the mobile device), and (2) the transaction identifier (which may include a kiosk identifier) to server 230. After receiving the information from the mobile device 150, the server 230 determines, based on the authentication information, that the user-account is authorized to initiate a transaction identified by the transaction identifier. When the user has been verified or authenticated, the server sends a confirmation to the kiosk device 100 that the user has been verified and the kiosk 100 then completes the transaction.

In some implementations, the server 230 can authenticate the user. For example, the memory 234 or storage device of server 230 contains a template gallery of users previously enrolled. Using the mobile device identifier, the server finds the template (e.g., facial images or fingerprint scans) associated with the mobile device identifier and compares those templates to the biometric information gathered by the mobile device during run-time to authenticate the user. In some implementations in which the user is partially authenticated by the mobile device 150, the server 230 can complete the authentication process. For example, the mobile device 150 can process the biometric information and then send the biometric information to the server 230. Upon receiving the processed biometric information of the user 130, the server 230 can determine that the user 130 is authorized to use the user-account associated with mobile device.

Figure 3:
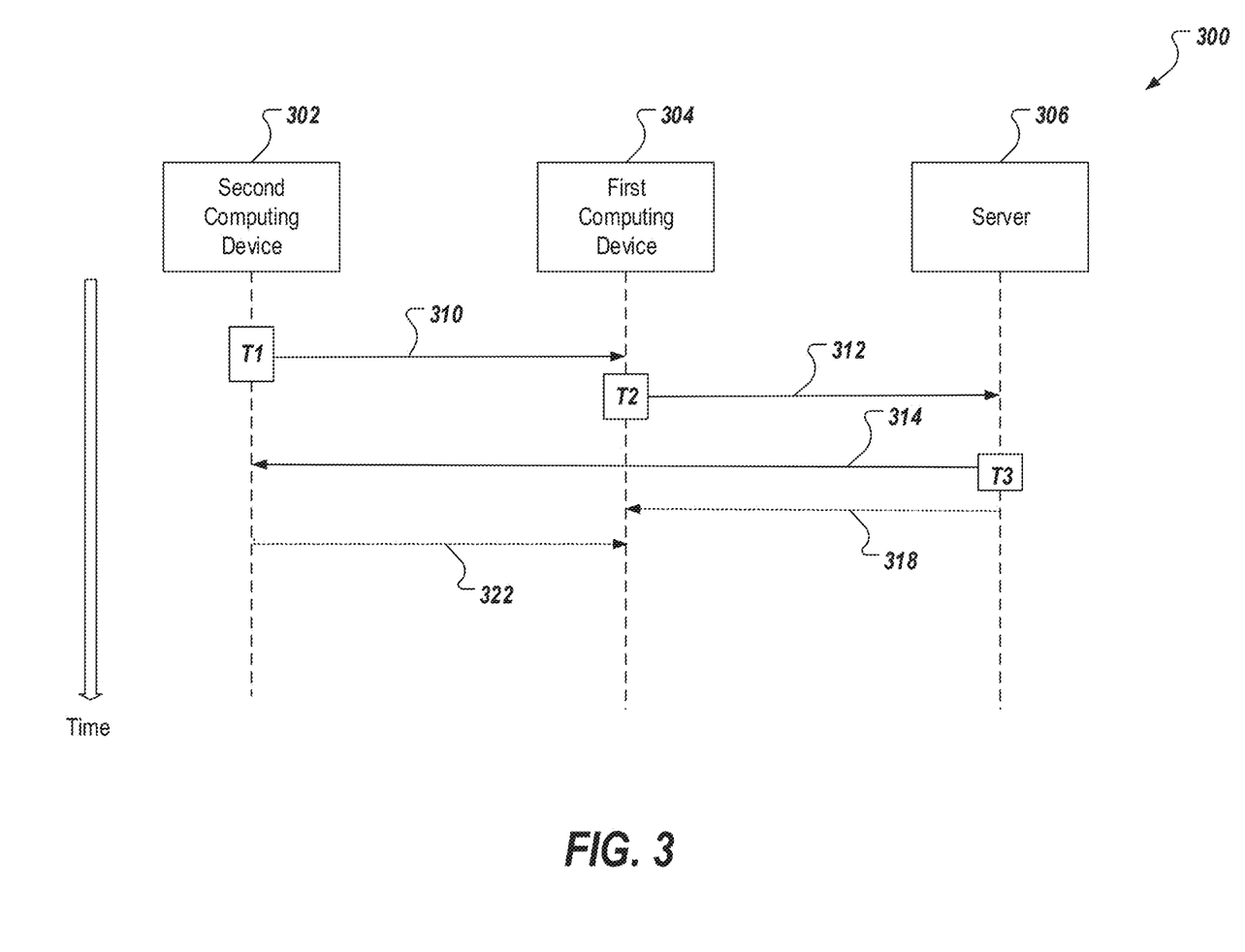
FIG. 3 depicts an example timing diagram in accordance with implementations of the present disclosure.

FIG. 3 depicts a timing diagram 300 that shows examples of interactions between devices, and/or back-end systems in accordance with implementations of the present disclosure. The example timing diagram 300 includes a second computing device 302 (e.g., the kiosk device of FIG. 1), a first computing device 304 (e.g., the mobile device of FIG. 1), and a back-end system implemented in a server 306 (e.g., the server of FIG. 2). In some implementations, the server 306 can be associated with a mobile application installed in the first computing device 304 (e.g., the server and the mobile application can be associated with the same institution such as a third-party payment platform).

In some implementations, a user (e.g., the user of FIG. 1) uses the second computing device 302 to initiate a transaction. For example, the user can use the second computing device 302 to select items to be purchased from a retailer. When the user indicates to the second computing device 302 that the transaction can be completed (e.g., the user selects a checkout option), the second computing device 302 generates a transaction identifier. At a time 'T1', the second computing device 302 communicates the transaction identifier 310 (which can include an identifier of the second computing device) to the first computing device 304 using a magnetic signal. Upon receiving the information from the second computing device 302, the first computing device 304 confirms that the user in possession of the first computing device 304 is an authorized user of the user-account associated with the first computing device (e.g., an application deployed on the first computing device 304 asks the user to perform an authentication/verification step such as entering a password or scanning a fingerprint). In some implementations, the user may already be authenticated (e.g., the user has already accessed the mobile application configured to process the transaction), and the first computing device 304 can communicate with the server 306 without receiving further instructions from the user. Upon verifying that the user is an authorized user (and in some cases after receiving a confirmation from the user to proceed with the transaction), the first computing device 304, at a time 'T2', sends the authentication information and at least part of the transaction identifier 312 to the server 306.

To process the payment, the first computing device 304 or the server 306 can automatically withdraw the amount from the user account or request payment authorization and execution from a financial institution linked to the user-account. In some implementations, the server 306 can process the authentication information to authenticate the user or to complete the authentication process. After receiving the information from the first computing device 304, the server 306, at a time 'T3', sends confirmation information 314 to the second computing device. To send the confirmation information, the server 306 uses the transaction identifier (which includes the identifier of the second computing device) to determine a location of the second computing device 302. The confirmation information may include a confirmation that the user interacting with the second computing device has been verified. The confirmation information can also include the authentication information associated with the first computing device. Upon receiving the confirmation information, the second computing device 302 can complete the transaction. In some optional implementations, upon receiving the information from the first computing device 304, the server 306 can send confirmation information 318 to the first computing device 304 for the first computing device to notify the user or the second computing device 302 that the user has been verified and/or that the transaction has been completed. In some implementations, the server 306 can send the confirmation information to both the first computing device and the second computing device. In some implementations, the second computing device 302, upon receiving the confirmation information from the server, can send confirmation information 322 to the first computing device 304 that the user has been verified and/or that the transaction has been completed. In some implementations, the second computing device 302 can remain in communication with the first computing device 304 throughout the transaction process. For example, the second computing device 302 can use a communication channel established between the first and second computing device to first send the transaction identifier at T1 to the first computing device 304 and then send confirmation information to the first computing device 304 at a later time.

Figure 4:
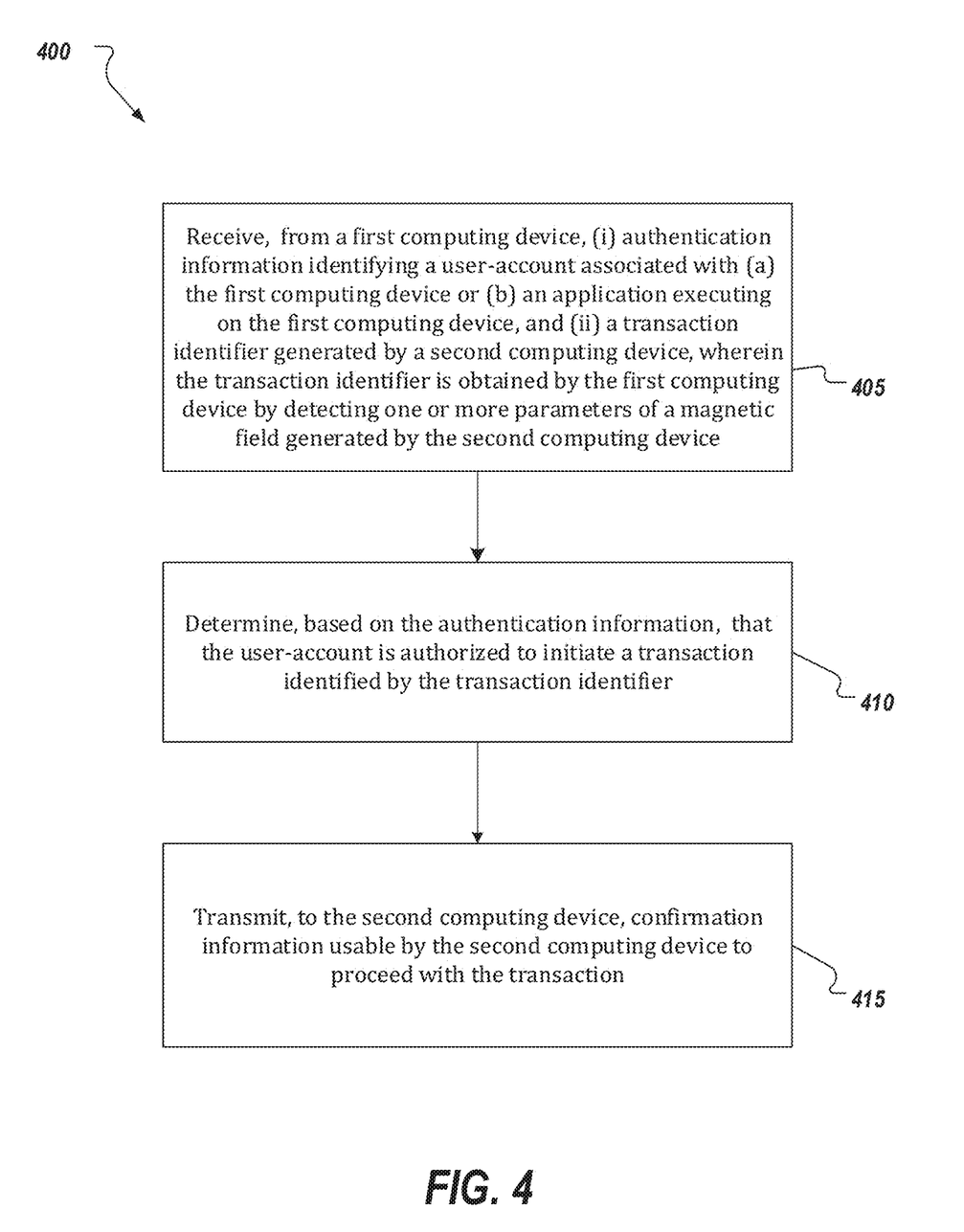
FIG. 4 is a flowchart of an example process for validating a transaction at a remote computing device.

FIG. 4 is a flowchart of an example process 400 for performing a transaction. In some implementations, at least a portion of the process 400 may be executed by one or more processing devices disposed within one or more servers such as the server 230 described with reference to FIG. 2. Operations of the process 400 includes receiving from a first computing device, (i) authentication information identifying a user-account associated with (a) the first computing device or (b) an application executing on the first computing device, and (ii) a transaction identifier generated by a second computing device, wherein the transaction identifier is obtained by the first computing device by detecting one or more parameters of a magnetic field generated by the second computing device (405). The second computing device may include a kiosk device and the first computing device may include a mobile computing device. The transaction identifier may include transaction information and a kiosk identifier, and the authentication identification may include a confirmation that the user has been identified or biometric information of the user, and a phone number or application identifier of the mobile computing device. The one or more parameters of the magnetic field can include a strength of the magnetic field and a direction of the magnetic field. The mobile computing device is considered to be in physical vicinity of the user (e.g. carried in pockets, a purse, or bag) to detect the kiosk-transmitted magnetic signal. The mobile computing device has a receiver that may include a sensor configured to detect the magnetic signal and may additionally include decoding software configured to decode the magnetic signal.

In some implementations, the authentication information can be transmitted from the first computing device responsive to determining that a user of the first computing device is authorized to access the user-account. The first computing device can be communicatively connected to a wearable device, and the authentication information can be transmitted from the first computing device responsive to receiving a transaction confirmation from the wearable device.

Operations of the process 400 further includes determining, by the server based on the authentication information, that the user-account is authorized to initiate a transaction identified by the transaction identifier (410), and transmitting, from the server to the second computing device confirmation information usable by the second computing device to proceed with the transaction (415).

Figure 5:
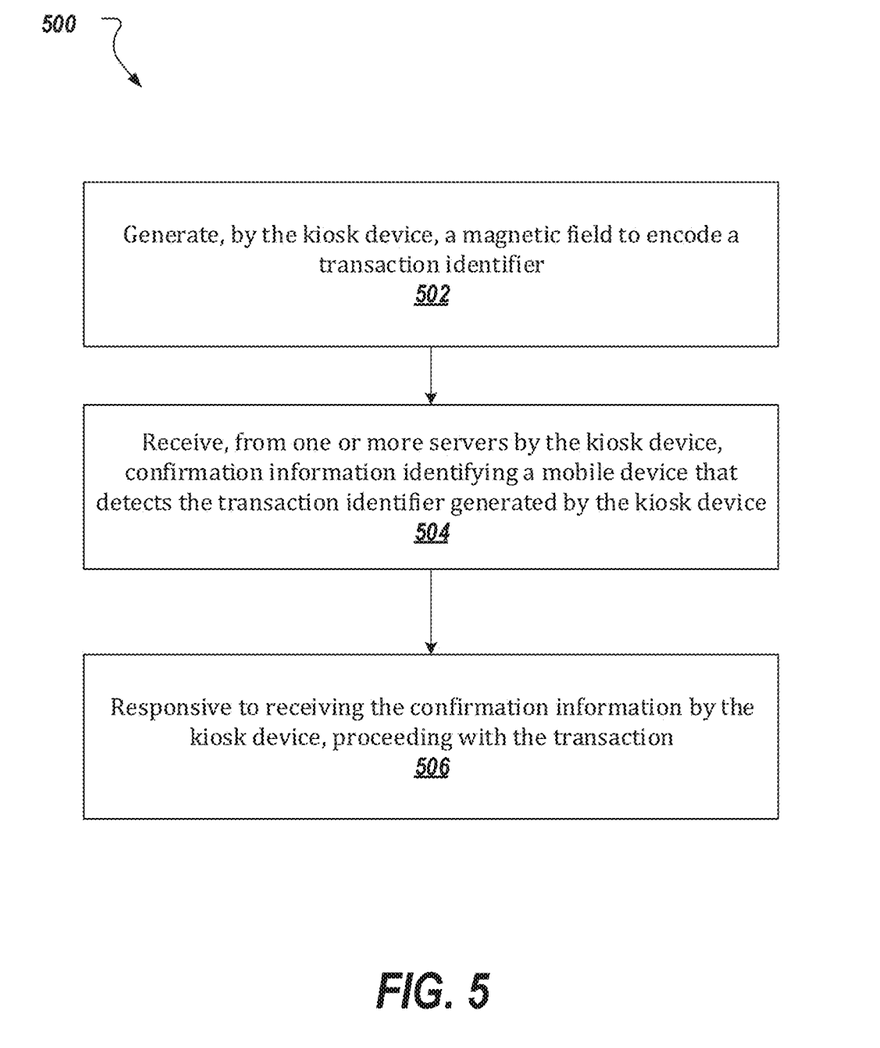
FIG. 5 is a flowchart of an example process for facilitating a transaction at a kiosk device.

FIG. 5 is a flowchart of an example process for facilitating a transaction. In some implementations, at least a portion of the process 500 may be executed by one or more kiosk devices such as the kiosk device 100 described with reference to FIG. 1A. Operations of the process 500 include generating, by the kiosk device, a magnetic field to encode a transaction identifier (502). The process 500 may, in addition, contain a proximity sensing mechanism, such as floor-embedded pressure sensors or other proximity sensors such as capacitive, infrared, ultrasonic, image based, or time of flight proximity sensors to initiate the magnetic field or magnetic signal transmission only when the user is properly standing in front of the kiosk. The process 500 further includes receiving, from one or more servers by the kiosk device, confirmation information identifying a mobile device that detects the transaction identifier generated by the kiosk device (504). Operations of the process 500 further include, responsive to receiving the confirmation information by the kiosk device, proceeding with the transaction (506).

Figure 6:
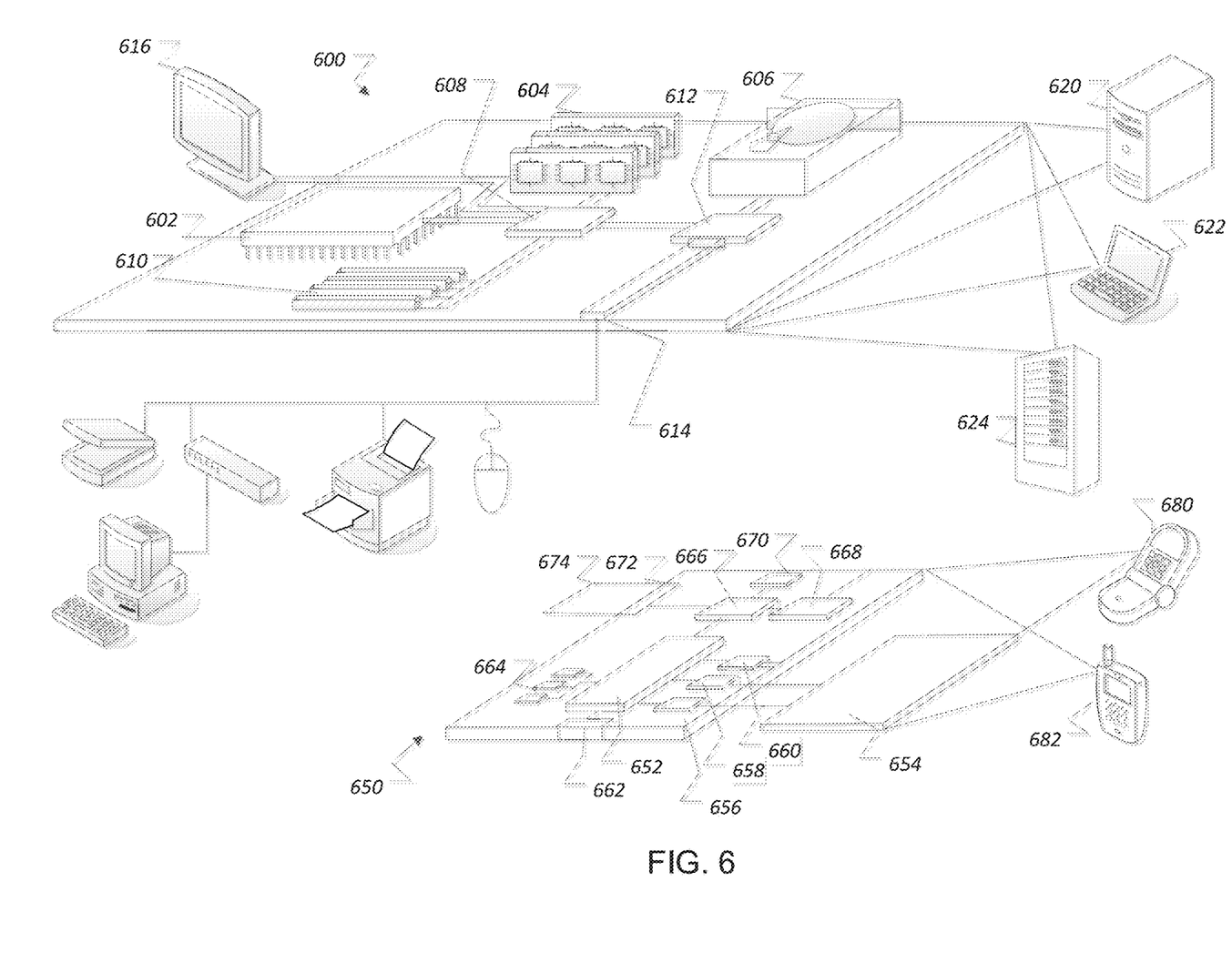
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 5400 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
   receiving, at one or more servers from a first computing device,
   (i) a first time stamp generated by the first computing device,
   (ii) authentication information identifying a user-account of a user associated with (a) the first computing device or (b) an application executing on the first computing device, wherein the authentication information identifying the user-account on the first computing device is provided via a wearable device that connects with the first computing device and automatically authenticates the user to the user-account on the first computing device, and
   (iii) a transaction identifier generated by a second computing device, wherein the transaction identifier comprises a) transaction information and b) an identifier of the second computing device, wherein the transaction identifier is obtained by the first computing device by detecting one or more parameters of a magnetic field generated by the second computing device, wherein the one or more parameters of the magnetic field comprise at least one of a strength of the magnetic field and a direction of the magnetic field and the magnetic field is detectable by the first computing device when the first computing device is positioned within 6 inches to 36 inches of the second computing device;
   receiving, at the one or more servers from the second computing device, a second time stamp generated by the second computing device, the second time stamp being indicative of a time at which the second computing device initiates transmission of the transaction information;
   determining, by the one or more servers based on i) the authentication information, ii) the first time stamp, and iii) the second time stamp, that the user-account is authorized to initiate a transaction corresponding to the transaction information included in the transaction identifier; and in response to determining that the user-account is authorized to initiate the transaction, transmitting, from the one or more servers to the second computing device based on the identifier of the second computing device that is obtained by the first computing device, confirmation information usable by the second computing device to proceed with the transaction.

2. The computer-implemented method of claim 1, wherein the authentication information is transmitted from the first computing device responsive to determining that a user of the first computing device is authorized to access the user-account.

3. The computer-implemented method of claim 1, wherein the transaction identifier comprises transaction information and the identifier of the second computing device.

4. The computer-implemented method of claim 1, wherein the first computing device comprises a receiver comprising a magnetic sensor configured to detect changes to the one or more parameters of the magnetic field.

5. A system comprising:
at least one processing device; and
a memory communicatively coupled to the at least one processing device, the memory storing instructions which, when executed, cause the at least one processing device to perform operations comprising:
receiving, from a first computing device,
(i) a first time stamp generated by the first computing device,
(ii) authentication information identifying a user-account of a user associated with (a) the first computing device or (b) an application executing on the first computing device, wherein the authentication information identifying the user-account on the first computing device is provided via a wearable device that connects with the first computing device and automatically authenticates the user to the user-account on the first computing device, and
(iii) a transaction identifier generated by a second computing device, wherein the transaction identifier comprises a) transaction information and b) an identifier of the second computing device, wherein the transaction identifier is obtained by the first computing device by detecting one or more parameters of a magnetic field generated by the second computing device, wherein the one or more parameters of the magnetic field comprise at least one of a strength of the magnetic field and a direction of the magnetic field and the magnetic field is detectable by the first computing device when the first computing device is positioned within 6 inches to 36 inches of the second computing device;
receiving, from the second computing device, a second time stamp generated by the second computing device, the second time stamp being indicative of a time at which the second computing device initiates transmission of the transaction information;
determining, based on i) the authentication information, ii) the first time stamp, and iii) the second time stamp, that the user-account is authorized to initiate a transaction corresponding to the transaction information included in the transaction identifier; and in response to determining that the user-account is authorized to initiate the transaction, transmitting, to the second computing device based on the identifier of the second computing device that is obtained by the first computing device, confirmation information usable by the second computing device to proceed with the transaction.

6. The system of claim 5, wherein the authentication information is transmitted from the first computing device responsive to determining that a user of the first computing device is authorized to access the user-account.

7. The system of claim 5, wherein the transaction identifier comprises transaction information and the identifier of the second computing device.

8. The system of claim 5, wherein the first computing device comprises a receiver comprising a magnetic sensor configured to detect changes to the one or more parameters of the magnetic field.

9. A non-transitory computer-readable storage medium having encoded thereon computer readable instructions for causing one or more processing devices to perform operations comprising:
receiving, from a first computing device,
(i) a first time stamp generated by the first computing device,
(ii) authentication information identifying a user-account of a user associated with (a) the first computing device or (b) an application executing on the first computing device, wherein the authentication information identifying the user-account on the first computing device is provided via a wearable device that connects with the first computing device and automatically authenticates the user to the user-account on the first computing device, and
(iii) a transaction identifier generated by a second computing device, wherein the transaction identifier comprises a) transaction information and b) an identifier of the second computing device, wherein the transaction identifier is obtained by the first computing device by detecting one or more parameters of a magnetic field generated by the second computing device, wherein the one or more parameters of the magnetic field comprise at least one of a strength of the magnetic field and a direction of the magnetic field and the magnetic field is detectable by the first computing device when the first computing device is positioned within 6 inches to 36 inches of the second computing device;
receiving, from the second computing device, a second time stamp generated by the second computing device, the second time stamp being indicative of a time at which the second computing device initiates transmission of the transaction information;
determining, based on i) the authentication information, ii) the first time stamp, and iii) the second time stamp, that the user-account is authorized to initiate a transaction corresponding to the transaction information included in the transaction identifier; and
in response to determining that the user-account is authorized to initiate the transaction, transmitting, to the second computing device based on the identifier of the second computing device that is obtained by the first computing device, confirmation information usable by the second computing device to proceed with the transaction.

10. The non-transitory computer-readable storage medium of claim 9, wherein the authentication information is transmitted from the first computing device responsive to determining that a user of the first computing device is authorized to access the user-account.

11. The non-transitory computer-readable storage medium of claim 9, wherein the transaction identifier comprises transaction information and the identifier of the second computing device.

12. The non-transitory computer-readable storage medium of claim 9, wherein the first computing device comprises a receiver comprising a magnetic sensor configured to detect changes to the one or more parameters of the magnetic field.

* * * * *